(12) United States Patent
Ott

(10) Patent No.: US 6,961,770 B1
(45) Date of Patent: Nov. 1, 2005

(54) INTELLIGENT NETWORK BASED APPLICATION RECOGNITION

(75) Inventor: Michael Ott, Rohnert Park, CA (US)

(73) Assignee: Cisco Technology, Inc., San Jose, CA (US)

(*) Notice: Subject to any disclaimer, the term of this patent is extended or adjusted under 35 U.S.C. 154(b) by 770 days.

(21) Appl. No.: 10/098,142

(22) Filed: Mar. 12, 2002

(51) Int. Cl.[7] ............................................. G06F 13/00
(52) U.S. Cl. ..................... 709/224; 709/223; 709/232; 709/230; 370/389
(58) Field of Search .............................. 709/219–230, 709/232–240, 250; 370/389

(56) References Cited

U.S. PATENT DOCUMENTS

| | | | | |
|---|---|---|---|---|
| 5,734,865 A | * | 3/1998 | Yu .............................. | 709/250 |
| 5,862,335 A | * | 1/1999 | Welch et al. ................ | 709/224 |
| 5,913,041 A | * | 6/1999 | Ramanathan et al. ....... | 709/233 |
| 6,078,953 A | * | 6/2000 | Vaid et al. ................... | 709/223 |
| 6,466,985 B1 | * | 10/2002 | Goyal et al. ................ | 709/238 |
| 6,651,099 B1 | * | 11/2003 | Dietz et al. ................. | 709/224 |
| 6,651,101 B1 | * | 11/2003 | Gai et al. .................... | 709/224 |
| 6,671,724 B1 | * | 12/2003 | Pandya et al. .............. | 709/226 |

OTHER PUBLICATIONS

Cisco Systems, Inc., "Overview: Network-Based Application Recognition [subtitled] Content Networking", retrieved from the Internet on Dec. 12, 2001: <URL:http://www.cisco.com/warp/public/cc/so/neso/lenesv/cxns/nbar_ov.htm>.

* cited by examiner

Primary Examiner—Glenton B. Burgess
Assistant Examiner—Trong-Nhan Phuoc Nguyen
(74) Attorney, Agent, or Firm—Charles E. Krueger

(57) ABSTRACT

A system and method for automatically creating application recognition data for a selected application. The application is started and shut down several times and packets transmitted between a client and server during the running of the application are analyzed to generate application recognition data used for subsequent recognition of the target application by the network.

17 Claims, 3 Drawing Sheets

INTELLIGENT NETWORK BASED APPLICATION RECOGNITION

BACKGROUND OF THE INVENTION

Classifying applications sounds like a simple task, but it is often a hard undertaking. The difficulty is that today's Internet-based and client-server applications make it difficult for the network to identify and provide the proper level of control needed.

NBAR, Network Based Application Recognition, developed by the assignee of the present patent application, solves this problem by adding intelligent network classification to a network infrastructure. NBAR is a new classification engine that can recognize a wide variety of applications, including Web-based and client/server applications that dynamically assign Transmission Control Protocol (TCP) or User Datagram Protocol (UDP) port numbers.

Once the application is recognized, the network can invoke specific services for that particular application. NBAR currently works with Quality of Service (QoS) features to ensure that the network bandwidth is best used to fulfill customer objectives. These features include the ability to guarantee bandwidth to critical applications, limit bandwidth to other applications, drop selective packets to avoid congestion, and mark packets appropriately so that the customer's network and the service provider's network can provide the proper QoS from end to end.

NBAR, as currently implemented, supports a wide range of network protocols, including these stateful protocols that were once difficult to classify, including:

HTTP classification by URL, Host and MIME type
Citrix published application
Oracle SQL*NET
Sun RPC
Microsoft Exchange
UNIX r commands
VDOLive
RealAudio
Microsoft Netshow
File Transfer Protocol (FTP)
StreamWorks
Trivial File Transfer Protocol (TFTP)

NBAR can also classify static-port protocols such as those currently classifiable with access control lists (ACLs).

New protocol support can be quickly and easily added via packet description language modules (PDLMs). PDLMs contain the rules used by NBAR to recognize an application and in most cases can be loaded without the need for a new OS software image or even a reboot.

Thus, the currently implemented Network Based Application Recognition (NBAR) is a classification mechanism that uses Protocol Discovery Language (.pdl) files to recognize what application is contained in the payload of a packet. The system is modular, being initially configured to recognize a standard set of widely used important protocols and capable of being selectively expanded by adding PDLMs to enable recognition of selected additional protocols not included in the standard set.

To create one of these .pdl files requires a network trace and a design engineer. NBAR uses a flexible packet description language that facilitates the quick and easy addition of support for new applications. Once the file is done the customer must load the file into the router and restart NBAR. Because of the speed that new applications hit the market, the time and money to extend the NBAR capability to recognize the new applications is substantial.

BRIEF SUMMARY OF THE INVENTION

In one embodiment of the invention, application recognition data for a selected application is generated by starting a learning node, which is a router set to learning mode or another external networked device running the recognition software. The selected application to be recognized is then started and a group of its packets is analyzed to automatically generate application recognition data which can subsequently be used to recognize the application on the network.

In another embodiment of the invention, the target application is started and shut down a selected number of times. A group of packets including payload data from the target application is saved at a learning node each time the target application is started and shut down and a buffer of packets is stored each time the selected application is started. The target application payload data from the saved packets is analyzed to establish patterns for recognizing the target application.

In another embodiment of the invention, the application recognition data is utilized to update data structures in the learning node used by the network to recognize applications. The recognition capability of the network to recognize the selected application is thereby extended.

Other features and advantages of the invention will now be apparent in view of the following detailed description and appended drawings.

DETAILED DESCRIPTION OF THE INVENTION

The invention will now be described, by way of example not limitation, with reference to various preferred embodiments. In the following, an embodiment that operates on a network utilizing the TCP/IP protocol will be described. The following glossary is provided to assist understanding the following description:

Glossary

PDLM—Packet Description Language Module. A file containing Packet Description Language statements used to define the signature of one or more application protocols.

Stateful protocol—A protocol that uses dynamically allocated connection points that are determined at connection time.

Static protocol—A protocol that uses well-defined connection points for communication.

Subport classification—The classification of network traffic by information contained in the packet payload; that is, information found beyond the connection point information.

TCP is a connection-oriented protocol that performs such functions as flow control, reliability, and error recovery. TCP is stateful protocol where a master process, the server, keeps track of client process. TCP can be modeled as a finite state machine with eleven states.

In TCP, every communication process starts with the three-way handshake. The client sends a SYN packet to the server, containing its sequence number of the communication. The server responds with a SYN-ACK back to the client, confirming the client's sequence number and sending its own sequence number. Then the client in return sends another ACK, acknowledging the server's sequence number. Now the connection between client and server is established. When the connection shall be terminated, the server and the client exchange a similar communication dialogue to end the communication and close the connection gracefully. Either client or server sends a FIN request to the other. The other party sends an ACK followed by a FIN. A final ACK terminates the connection gracefully.

In this embodiment, a learning mode analyzes packets generated by a selected client application to an application footprint that can be utilized by the network to recognize the application.

Figure 1:
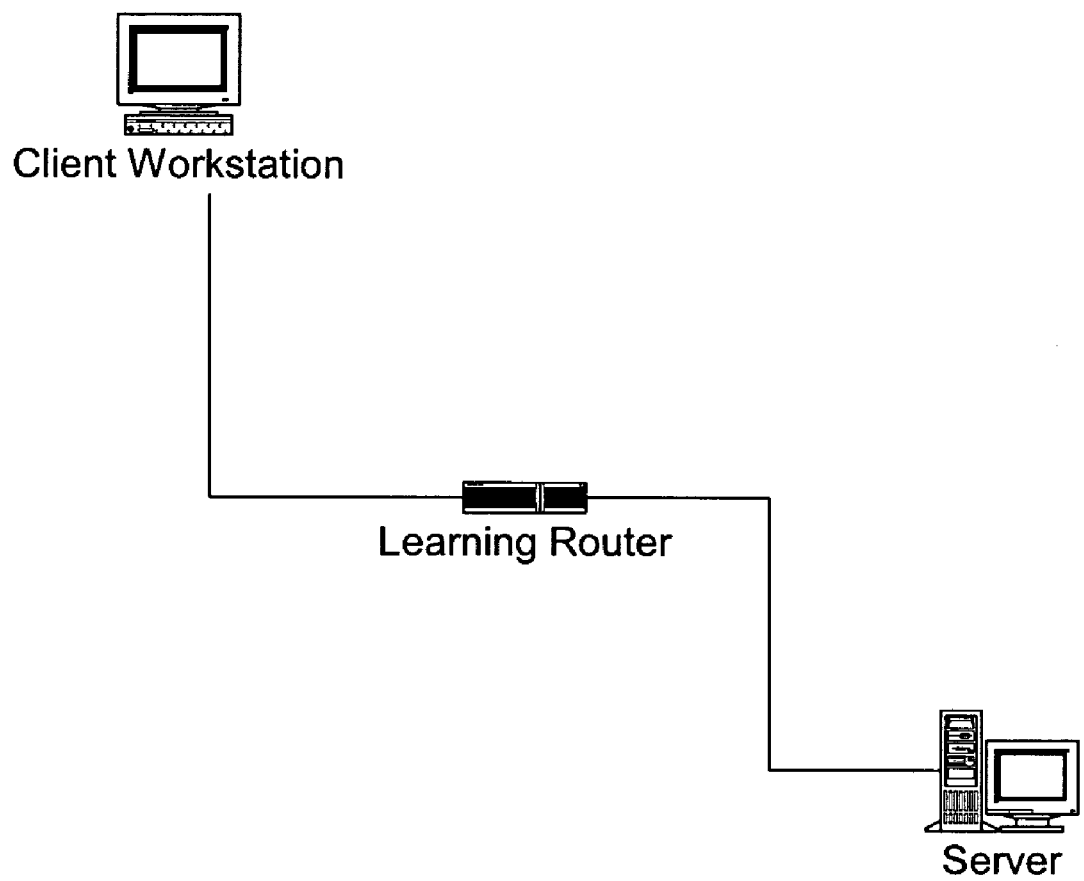
FIG. 1 is a schematic diagram depicting a network including a learning router.

Initially, the selected target client application is loaded on a client workstation and the target server application is loaded on a server or other workstation on a location on the network that will insure that the packets flow through a "learning" node as depicted in FIG. 1. At this point no other applications should be running on the client workstation.

The learning node can be a router or a digital computer coupled to the router. The exact configuration is not critical but will be determined by factors such as the amount of available memory and processing power available at the router and the amount of memory and processing power required by the learning procedure.

Figure 2:
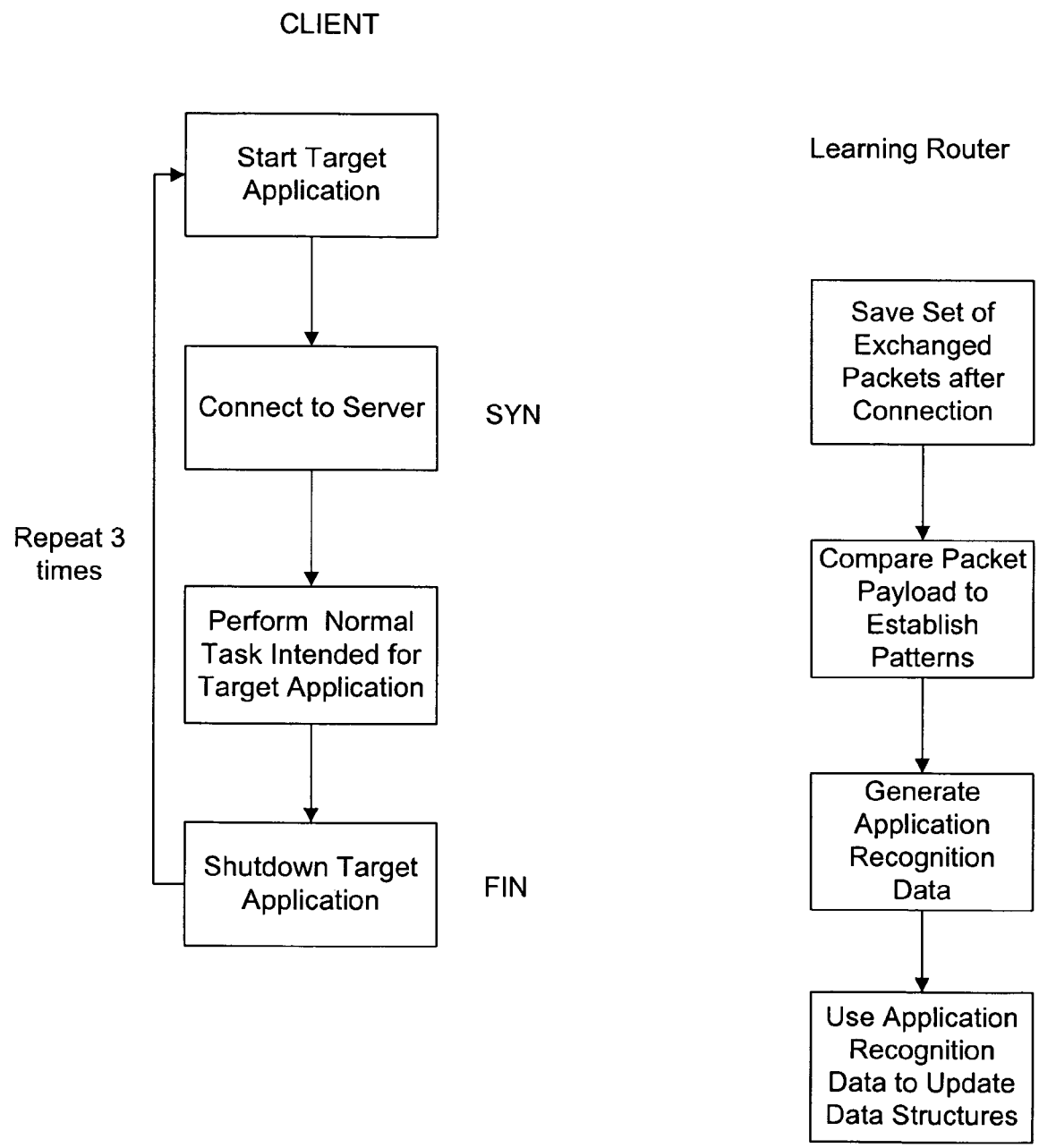
FIG. 2 is a flow diagram depicting acts implemented by a preferred embodiment of the invention.

The operation of the learning mode will now be described with reference to the flow chart of FIG. 2. The "learning engine" on the learning node is activated and the client IP address and the server IP address are supplied. The next steps are to start the selected client software, connect to the server, and perform a normal task intended for the selected application. The selected client application is then shut down and the process is repeated several times.

Each time the selected client is started, the learning router saves a group of packets, for example the first 20 packets, and stores the group of packets in a buffer. The destination port number for the target server application can be determined during the packets exchanged during the TCP handshake. This destination port number is often sufficient information to recognize the selected client application.

The first packets transmitted by the client after TCP connection has been established (using the handshake procedure describe above) will usually contain application specific information in the first 20 bytes of the payload. The next packet coming back from the server will usually contain a standard reply in the first 20 bytes of the payload. This subport classification data is used to establish a recognition footprint as described below.

The application is then shut down and restarted a selected number of times, for example three times, so that the above-described procedure can be repeated to store a second set of packets in a second buffer, a third set of packets in a third buffer, and so on.

Once the three sets of packets are stored the payloads of the packets are compared to identify patterns in the payload data. For example, many applications transmit a character string including the application name, version number, serial number and other identifying information. Various matching techniques using parsers and other standard tools known in the art can be utilized to identify patterns in the payload data.

After the recognition data for the selected client application has been determined it can be utilized to implement application recognition procedures in the network. Generally, application recognition data structures that contain application recognition information that is used by the network to implement application recognition procedures are stored in network memory. These recognition data structures may include both port classification data and subport classification data.

When the application recognition data has been obtained for the selected application, procedures are performed to modify the application recognition data structures so that the network can recognize the selected client application.

In a preferred embodiment of the invention the acts and procedures described above are encoded in software, stored on a computer readable medium, and are performed by a digital computer system that executes the software. As described above, the digital processing apparatus can be located in a router, external to a router, or distributed between a router and other components.

The computer readable medium may include, among other things, magnetic media, optical media, electro-magnetic fields encoding digital information, and so on.

Figure 3:
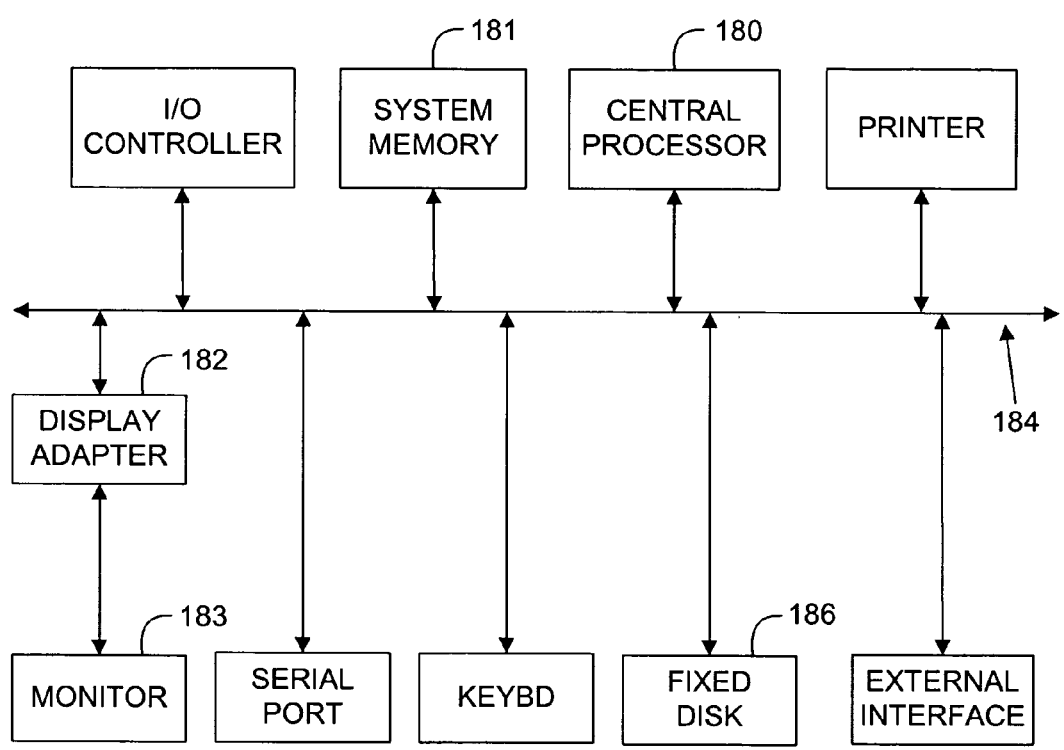
FIG. 3 is a block diagram of a computer system utilized to implement an embodiment of the invention.

FIG. 3 depicts a digital processing apparatus suitable for use with embodiments of the present invention. In FIG. 3, the subsystems are represented by blocks such as central processor 180, system memory 181, display adapter 182, and monitor 183. The subsystems are interconnected via a system bus 184. Additional subsystems such as a printer, keyboard, fixed disk 156, or other computer readable storage media, are shown. The interconnection via system bus 184 allows central processor 180 to communicate with each subsystem and to control the execution of instructions from system memory 181 or computer readable storage medium 186 and exchange information between subsystems. Other arrangements of subsystems and interconnections are possible.

Thus a system is provided that allows customers to generate application recognition data for new client applications at their own facility. The learning engine is the only piece of software that must be maintained at the customer's site.

The invention has now been described with reference to the preferred embodiments. Alternatives and substitutions will now be apparent to persons of ordinary skill in the art. For example, the learning engine could be used with other stateful protocols in addition to TCP. Further, the particular number of packets buffered and payloads analyzed are provided by way of example and may be varied as understood by persons of skill in the art. Additionally, the computer system depicted in FIG. 3 is provided by way of example and may be reconfigured as is well known in the art. Accordingly, it is not intended to limit the application except as provided by the intended claims.

What is claimed is:

1. A method for generating application recognition information for a selected application loaded on a client workstation, and a server target application loaded on a server, to allow recognition of the selected client application by the network, with the client workstation and server connected to the network so that packets transferred therebetween flow through a learning node, said method comprising the steps of:

(a) providing client and server addresses to the learning node;

(b) at the client workstation, starting the client target application and performing a task intended for the target client application;

at the learning node:

(c) subsequent to a first establishment of a connection between the client and server target applications, saving a first set of packets sent by the client application having payload data generated as the selected application is starting up;

(d) shutting down and restarting the client application;

(e) subsequent to a second establishment of a connection between the client and server target applications, saving a second set of packets sent by the client application having payload data generated as the selected application is starting up;

(f) analyzing payload data in the first and second sets of saved packets to create application recognition pattern data based on the selected application payload data.

2. The method of claim 1 where said step of analyzing further comprises the step of:

examining handshaking packets exchanged between the selected client application and the target server application to determine the destination address of the target server application.

3. The method of claim 1 where said step of analyzing further comprises the step of:

examining packet payload data for strings always transmitted by the selected client application upon start up.

4. The method of claim 1 further comprising the step of:

utilizing the application recognition pattern data to update network data structures utilized by the network to recognize applications so that the network can recognize the selected application.

5. In a network including an application recognition feature that allows the network to recognize an application included in a fixed group of recognizable applications, with the recognition feature including application recognition data structures, stored in the network, with the application recognition data structures including recognition data required to recognize applications included in the fixed group of recognizable applications, a method for automatically extending the capability of the recognition feature to recognize a selected application not included in the set of recognizable applications, said method comprising the steps of:

loading the selected application on a computer system on the network;

starting and shutting down the selected application at least two times;

at a learning node that receives packets exchanged between the client application and the target server application:

each time the selected application starts, storing a group of packets transmitted by the selected application;

analyzing payload data of different groups of packets to identify patterns repeated in the payload data to generate application recognition data for the selected application;

modifying the application recognition data structures to include the application recognition data for the selected application so that the recognition feature is extended to include the selected application.

6. The method of claim 5 where said step of analyzing further comprises the step of:

examining handshaking packets exchanged between the selected client application and the target server application to determine the destination address of the target server application.

7. The method of claim 5 where said step of analyzing further comprises the step of:

examining packet payload data for strings always transmitted by the selected client application upon start up.

8. The method of claim 5 further comprising the step of:

utilizing the application recognition pattern data to update network data structures utilized by the network to recognize applications so that the network can recognize the selected application.

9. A computer program product for generating application recognition information for a selected application loaded on a client workstation, and a server target application loaded on a server, to allow recognition of the selected client application by the network, with the client workstation and server connected to the network so that packets transferred therebetween flow through a learning node including a digital computer system, where the selected client and target server addresses are supplied to the learning node and the selected client application is started and shut down at least two times, the computer program product comprising:

a computer usable medium having computer readable program code physically embodied therein, said computer program product further comprising:

computer readable program code for, subsequent to a first establishment of a connection between the client and server target applications, causing said digital computer to save a first set of packets sent by the client application having payload data generated as the selected application is starting up;

computer readable program code for, subsequent to restarting of the selected application and a second establishment of a connection between the client and server target applications, causing said computer to save a second set of packets sent by the client application having payload data generated as the selected application is starting up;

computer readable program code for causing said digital computer to analyze payload data in the first and second sets of saved packets to create application recognition pattern data based on the selected application payload data.

10. The computer program product of claim 9 further comprising:

computer readable program code for causing said digital computer to utilize the application recognition pattern data to update network data structures utilized by the network to recognize applications so that the network can recognize the selected application.

11. The the computer program product of claim 9 where said computer program code for analyzing further comprises:

computer program code for causing said computer to examine packet payload data for strings always transmitted by the selected client application upon start up.

12. The computer program product of claim 9 further comprising:

computer program code for causing said computer to utilize the application recognition pattern data to update network data structures utilized by the network to recognize applications so that the network can recognize the selected application.

13. A system for generating application recognition information for a selected application loaded on a client workstation, and a server target application loaded on a server, to allow recognition of the selected client application by the network, with the client workstation and server connected to the network so that packets transferred therebetween flow through a learning node, with the learning node provided with the selected client and target server addresses, and with the client application started at least two times, said system having a learning node comprising:

means for, subsequent to a first establishment of a connection between the client and server target applications, saving a first set of packets sent by the client application having payload data generated as the selected application is starting up;

means for, subsequent to restarting the selected application and a second establishment of a connection between the client and server target applications, saving a second set of packets sent by the client application having payload data generated as the selected application is starting up;

means for analyzing payload data in the first and second sets of saved packets to create application recognition pattern data based on the selected application payload data.

14. The system of claim 13 where said means for analyzing further comprises:

means for examining handshaking packets exchanged between the selected client application and the target server application to determine the destination address of the target server application.

15. The system of claim 13 where said means for analyzing further comprises the step of:

means for examining packet payload data for strings always transmitted by the selected client application upon start up.

16. The system of claim 13 further comprising:

means for utilizing the application recognition pattern data to update network data structures utilized by the network to recognize applications so that the network can recognize the selected application.

17. A method for generating application recognition information for a selected application loaded on a client workstation, and a server target application loaded on a server, to allow recognition of the selected client application by the network, with the client workstation and server connected to the network so that packets transferred therebetween flow through a learning node including a digital computer system, where the selected client and target server addresses are supplied to the learning node and the selected client application is started and shut down at least two times, the method comprising the steps of:

subsequent to a first establishment of a connection between the client and server target applications, saving a first set of packets sent by the client application having payload data generated as the selected application is starting up;

subsequent to restarting of the selected application and a second establishment of a connection between the client and server target applications, saving a second set of packets sent by the client application having payload data generated as the selected application is starting up;

analyzing payload data in the first and second sets of saved packets to create application recognition pattern data based on the selected application payload data.

\* \* \* \* \*